United States Patent
Davis

(10) Patent No.: US 9,841,743 B2
(45) Date of Patent: Dec. 12, 2017

(54) APPARATUS AND METHOD FOR REMOTE ADMINISTRATION AND RECURRENT UPDATING OF CREDENTIALS IN AN ACCESS CONTROL SYSTEM

(71) Applicant: Videx, Inc., Corvallis, OR (US)

(72) Inventor: Paul R. Davis, Corvallis, OR (US)

(73) Assignee: Videx, Inc., Corvallis, OR (US)

( * ) Notice: Subject to any disclaimer, the term of this patent is extended or adjusted under 35 U.S.C. 154(b) by 0 days.

(21) Appl. No.: 14/680,048

(22) Filed: Apr. 6, 2015

(65) Prior Publication Data

US 2015/0287256 A1 Oct. 8, 2015

Related U.S. Application Data

(60) Provisional application No. 61/975,911, filed on Apr. 7, 2014.

(51) Int. Cl.
*G07C 9/00* (2006.01)
*G05B 19/02* (2006.01)

(52) U.S. Cl.
CPC ......... *G05B 19/02* (2013.01); *G07C 9/00309* (2013.01); *G07C 2009/0088* (2013.01);
(Continued)

(58) Field of Classification Search
CPC ................ G05B 19/02; G07C 9/00309; G07C 2009/00865; G07C 2009/0088;
(Continued)

(56) References Cited

U.S. PATENT DOCUMENTS 4,712,398 A 12/1987 Clarkson et al.
4,789,859 A 12/1988 Clarkson et al.
(Continued)

FOREIGN PATENT DOCUMENTS

EP 2348490 A1 7/2011
EP 2085934 B1 7/2013
WO 2004092514 A1 10/2004

OTHER PUBLICATIONS

UTC Fire & Security Americas Corporation, Inc., "eKEY® for Android™ User Manual", Rev May 2, 2011, Supraekey.com, retrieved from the Internet: <URL:http://www.supraekey.com/Documents/ekey-android-uman.pdf>, [available on the Internet at least as early as Jan. 16, 2013].

(Continued)

*Primary Examiner* — Edwin Holloway, III
(74) *Attorney, Agent, or Firm* — Matthew D. Eskue

(57) ABSTRACT

A portable electronic key for use with an electronic locking device comprises a wireless communications module, a processor, and a software application configured to transmit, receive, and respond to electronic messages related to access control information. The electronic messages are formatted according to a request-response protocol. The wireless communications module is configured to use a standardized communication protocol to establish a wireless communications link with a networking device operably associated with a remote administration device located away from the portable electronic key. The software application periodically exchanges, via the wireless communications link, request-response messages related to access control information with a server application of the remote administration device. The processor responds to the exchange of request-response messages by performing at least one of modifying access control information of the portable electronic key or providing access control information of the portable electronic key to the remote administration device.

20 Claims, 7 Drawing Sheets

(52) U.S. Cl.
CPC ............. *G07C 2009/00476* (2013.01); *G07C 2009/00587* (2013.01); *G07C 2009/00769* (2013.01); *G07C 2009/00865* (2013.01)

(58) Field of Classification Search
CPC ........... G07C 2009/00769; G07C 2009/00476; G07C 2009/00587
USPC ............................................... 340/5.25, 5.73
See application file for complete search history.

(56) References Cited

U.S. PATENT DOCUMENTS

| | | | |
|---|---|---|---|
| 4,829,296 A | 5/1989 | Clark et al. | |
| 4,887,292 A | 12/1989 | Barrett et al. | |
| 4,916,443 A | 4/1990 | Barrett et al. | |
| 5,046,084 A | 9/1991 | Barrett et al. | |
| 5,140,317 A | 8/1992 | Hyatt, Jr. et al. | |
| 5,170,431 A | 12/1992 | Dawson et al. | |
| 5,245,652 A | 9/1993 | Larson et al. | |
| 5,280,518 A | 1/1994 | Danler et al. | |
| 5,319,362 A | 6/1994 | Hyatt, Jr. | |
| 5,351,042 A | 9/1994 | Aston | |
| 5,617,082 A | 4/1997 | Denison et al. | |
| 5,745,044 A | 4/1998 | Hyatt, Jr. et al. | |
| 5,815,557 A * | 9/1998 | Larson ............... G07C 9/00023 235/382 | |
| 6,000,609 A | 12/1999 | Gokcebay et al. | |
| 6,005,487 A | 12/1999 | Hyatt, Jr. et al. | |
| 6,359,547 B1 | 3/2002 | Denison et al. | |
| 6,374,653 B1 | 4/2002 | Gokcebay et al. | |
| 6,472,973 B1 | 10/2002 | Harold et al. | |
| 6,474,122 B2 | 11/2002 | Davis | |
| 6,552,650 B1 | 4/2003 | Gokcebay et al. | |
| 6,564,600 B1 | 5/2003 | Davis | |
| 6,581,161 B1 | 6/2003 | Byford | |
| 6,604,394 B2 | 8/2003 | Davis | |
| 6,615,625 B2 | 9/2003 | Davis | |
| 6,718,806 B2 | 4/2004 | Davis | |
| 6,720,861 B1 * | 4/2004 | Rodenbeck ........ G07C 9/00103 340/5.6 | |
| 6,822,552 B2 | 11/2004 | Lidén et al. | |
| 6,822,553 B1 | 11/2004 | Henderson et al. | |
| 6,895,792 B2 | 5/2005 | Davis | |
| 6,900,720 B2 | 5/2005 | Denison et al. | |
| 6,937,140 B1 | 8/2005 | Outslay et al. | |
| 6,977,576 B2 | 12/2005 | Denison et al. | |
| 7,019,615 B2 | 3/2006 | Denison et al. | |
| 7,145,434 B2 | 12/2006 | Mlynarczyk et al. | |
| 7,181,507 B1 | 2/2007 | Lavelle et al. | |
| 7,295,100 B2 | 11/2007 | Denison et al. | |
| 7,334,443 B2 | 2/2008 | Meekma et al. | |
| 7,373,352 B2 | 5/2008 | Roatis et al. | |
| 7,456,725 B2 | 11/2008 | Denison et al. | |
| 7,471,199 B2 | 12/2008 | Zimmerman et al. | |
| 7,482,907 B2 | 1/2009 | Denison et al. | |
| 7,495,543 B2 | 2/2009 | Denison et al. | |
| 7,606,558 B2 | 10/2009 | Despain et al. | |
| 7,683,758 B2 | 3/2010 | Denison et al. | |
| 7,706,778 B2 | 4/2010 | Lowe | |
| 7,716,489 B1 | 5/2010 | Brandt et al. | |
| 7,741,952 B2 | 6/2010 | Denison et al. | |
| 7,821,395 B2 | 10/2010 | Denison et al. | |
| 7,999,656 B2 | 8/2011 | Fisher | |
| 8,074,271 B2 | 12/2011 | Davis et al. | |
| 8,102,799 B2 | 1/2012 | Alexander et al. | |
| 8,150,374 B2 | 4/2012 | Lowe | |
| 8,232,879 B2 | 7/2012 | Davis | |
| 8,334,765 B2 | 12/2012 | Weinstein et al. | |
| 8,368,507 B2 | 2/2013 | Conreux et al. | |
| 8,427,320 B2 | 4/2013 | Davis | |
| 8,482,379 B2 | 7/2013 | Conreux et al. | |
| 8,587,405 B2 | 11/2013 | Denison et al. | |
| 8,593,252 B2 | 11/2013 | Fisher | |
| 8,600,899 B1 | 12/2013 | Davis | |
| 8,643,487 B2 | 2/2014 | Roatis et al. | |
| 2002/0180582 A1* | 12/2002 | Nielsen .............. G07C 9/00103 340/5.6 | |
| 2006/0045107 A1* | 3/2006 | Kucenas ............. H04L 12/2803 370/401 | |
| 2006/0164206 A1* | 7/2006 | Buckingham ........... E05B 47/00 340/5.6 | |
| 2008/0163361 A1* | 7/2008 | Davis ...................... G06F 21/31 726/19 | |
| 2009/0051486 A1 | 2/2009 | Denison et al. | |
| 2010/0300163 A1 | 12/2010 | Loughlin et al. | |
| 2011/0276609 A1 | 11/2011 | Denison | |
| 2011/0289123 A1 | 11/2011 | Denison | |
| 2011/0311052 A1* | 12/2011 | Myers ................ G07C 9/00103 380/270 | |
| 2012/0011366 A1 | 1/2012 | Denison | |
| 2012/0011367 A1 | 1/2012 | Denison | |
| 2012/0213362 A1 | 8/2012 | Bliding et al. | |
| 2013/0027177 A1 | 1/2013 | Denison | |
| 2013/0187756 A1* | 7/2013 | Fisher ................ G07C 9/00571 340/5.61 |
| 2013/0234836 A1 | 9/2013 | Davis | |
| 2013/0326595 A1 | 12/2013 | Myers et al. | |

OTHER PUBLICATIONS

Videx, Inc., "CyberAudit-Web Professional Reference Manual, Version 1.1", MN-CYA-08, Cyberlock.com, retrieved from the Internet: <URL:http://www.cyberlock.com/assets/cyberaudit-web-pro-manual.pdf>, [available on the Internet at least as early as Feb. 9, 2013].

* cited by examiner

APPARATUS AND METHOD FOR REMOTE ADMINISTRATION AND RECURRENT UPDATING OF CREDENTIALS IN AN ACCESS CONTROL SYSTEM

CROSS REFERENCE TO RELATED APPLICATIONS

This application claims priority to U.S. Provisional Patent Application No. 61/975,911, filed Apr. 7, 2014, entitled "APPARATUS AND METHODS FOR ELECTRONIC ACCESS CONTROL," the entirety of which is herein incorporated by reference.

TECHNICAL FIELD

This disclosure relates to the field of access control, and, more particularly to an improved electronic key for use with an electronic lock in an access control system.

BACKGROUND INFORMATION

It has become commonplace in the broad field of access control for locks and keys to incorporate electronic components that control various aspects of the locking and unlocking process. Indeed, the automobile industry has long been familiar with keyless entry systems that utilize electronic components to control access to a vehicle.

In other areas of access control, for example securing areas of a large commercial building wherein locks are installed on doors, cabinets, and other enclosures, it is desirable to replace traditional mechanical lock cylinders in an access control system with electronic or electro-mechanical locks.

In access control systems incorporating electronic or electro-mechanical locks, it is often advantageous to provide a system administrator or system user with the ability to monitor and/or control the operation of electronic locks from a computer station, for example by connecting the electronic locks to a data network via a wireless local area network (WLAN) or a permanent hardwire connection. However, the costs associated with installing, connecting, and maintaining such a system may be prohibitive, particularly in a large or sprawling complex. Moreover, the location of certain locks may not be conducive to either form of connection. In addition to maintaining an adequate communications infrastructure, dedicated administration software is generally required to manage the access control system. This software adds additional costs to the system and computer updates or hardware changes may cause system malfunctions.

SUMMARY

In general, this disclosure provides examples of an apparatus and method for facilitating remote administration of an access control system. In one embodiment, a portable electronic key for use with an electronic locking device in an access control system comprises a wireless communications module, a processor, and a software application configured to transmit, receive, and respond to electronic data messages related to access control information. The electronic messages related to access control information are formatted according to a request-response protocol. The wireless communications module is configured to use a standardized communication protocol to establish a wireless communications link with a networking device operably associated with a remote administration device located away from the portable electronic key. The software application periodically exchanges, via the wireless communications link, request-response messages related to access control information with a server application of the remote administration device. The processor responds to the exchange of request-response messages by performing at least one of modifying access control information of the portable electronic key or providing access control information of the portable electronic key to the remote administration device.

In another embodiment, a method for remotely managing access control information of a portable electronic key comprises maintaining access control information including an access credential and details of previous access events in memory sites of the portable electronic key. The method further includes establishing a wireless communications link between the portable electronic key and a networking device operably associated with a remote administration device located away from the portable electronic key. The wireless communications link is established according to a standardized communication protocol. The method includes receiving, at the portable electronic key, a request-response message including an instruction for exchanging access control information between the portable electronic key and the remote administration device. The access control information includes information for modifying the access credential, providing details of previous access events, or combinations thereof. The method further includes, in response to receiving the message, accessing the memory sites of the portable electronic key for performing at least one of writing the access credential in accordance with the instruction or reading details of previous access events for reporting the details to the remote administration device.

In another embodiment, a portable electronic key includes an accelerometer to measure movements, orientations, vibrations, and other physical and environmental influences acting on the key. A processor of the portable electronic key responds to signals from the accelerometer by enabling and disabling components of the portable electronic key, modifying memory sites of the portable electronic key, transmitting access control information, or combinations thereof.

In yet another embodiment, a portable electronic key in an access control system including multiple keys exchanges request-response messages related to access control information with other portable electronic keys in the access control system to synchronize certain access control information between the multiple keys.

The details of one or more implementations of the various embodiments are set forth in the accompanying drawings and the detailed description below. Other potential implementations of the subject matter will be apparent from the description and drawings, and from the claims.

BRIEF DESCRIPTION OF THE DRAWINGS

For a more complete understanding of this disclosure, the drawings herein illustrate examples of the various embodiments and implementations. The drawings, however, do not limit the scope of the disclosure. Similar references in the drawings indicate similar elements.

DETAILED DESCRIPTION

In view of the difficulties and costs associated with facilitating the exchange and maintenance of access control information in an access control system, the present inventor recognized that there is a need for providing remote monitoring and control of information associated with portable electronic keys deployed in an access control system.

Figure 1:
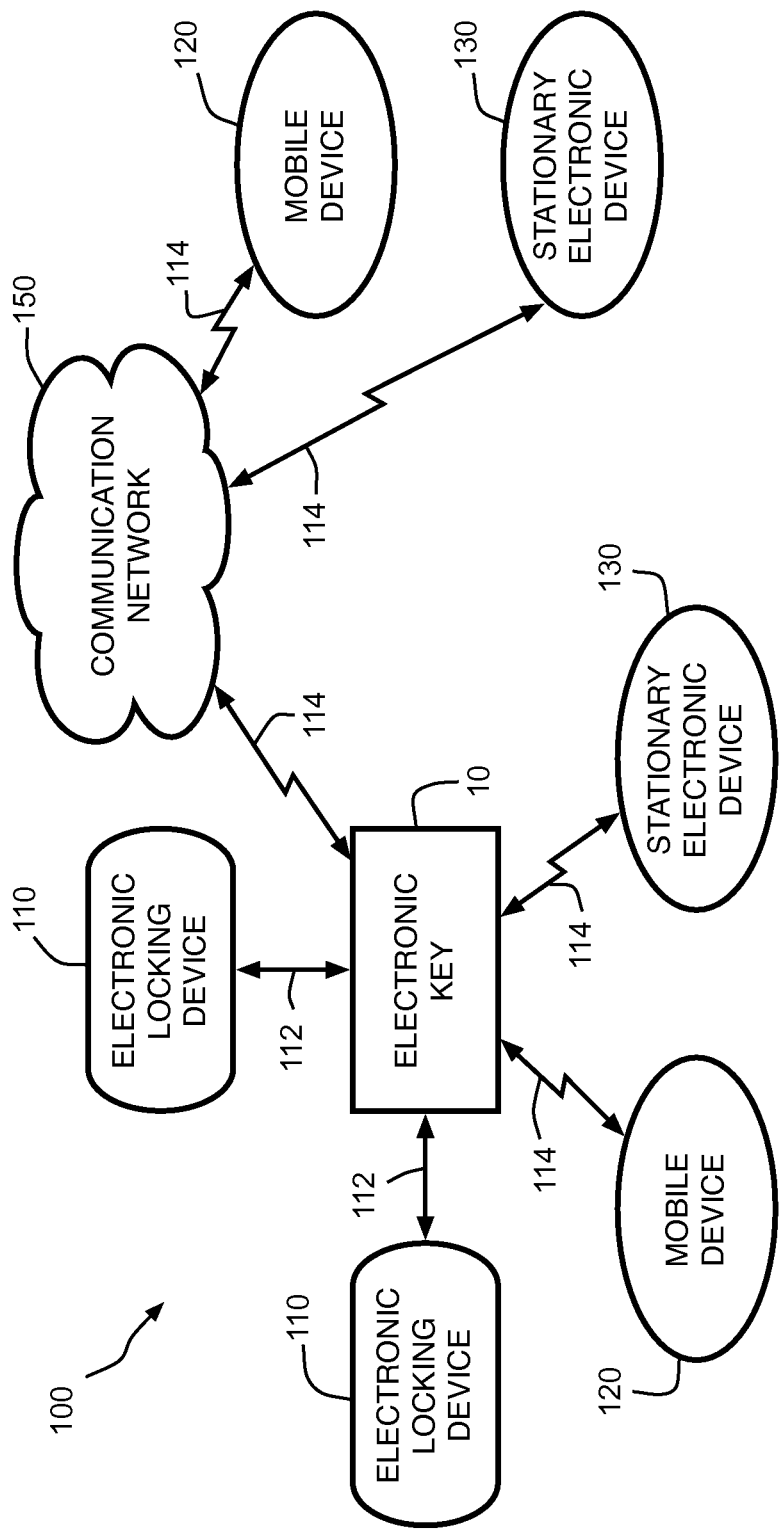
FIG. 1 is a block diagram illustrating an example access control system in accordance with various embodiments.

As illustrated generally in FIG. 1, an access control system 100 used to selectively control access to an area(s), enclosure(s), or item(s) comprises at least one electronic locking device 110. Electronic locking device 110 may be any locking device controlled, at least in part, by electrical signals and capable of selectively locking an access point, enclosure, or otherwise selectively restricting access to an area or item. Examples of various suitable electronic locking devices are described in U.S. Pat. Nos. 5,140,317, 5,351, 042, and 6,474,122, to name a few. According to various embodiments described herein, a portable electronic key 10 communicates with electronic locking device 110 via a bi-directional interface 112, for example to initiate an unlocking sequence or otherwise control operation of the locking device according to known methods.

Various methods and techniques for communicating with and/or controlling operation of an electronic locking device are known in the field of electronic locks. One example of a reliable method is that described in the aforementioned '122 patent assigned to Videx, Inc., assignee of this disclosure. As illustrated in greater detail in the '122 patent, operation and/or unlocking of an electronic locking device may be initiated by transmitting information comprising a unique identification code and password, stored in memory of an electronic key, to the electronic locking device. The electronic locking device may then compare the received identification code and password against a list of authorized keys and passwords stored in memory of the electronic locking device. If the transmitting key is indeed authorized to operate the electronic locking device, and the transmitted password is accurate, the electronic locking device may thereafter be opened. It will be appreciated that other known methods and techniques for operating an electronic locking device may demand additional authentication variables that further restrict access, for example time and/or date constraints that limit the period during which a key is authorized to operate a lock. In accordance with other suitable methods and techniques, the electronic key may store a record of successful and/or unsuccessful access events in memory of the electronic key and/or the electronic locking device. As operation varies across access control systems, skilled persons will appreciate that the term "access event" refers to any event involving a component of access control system 100. Depending on the arrangement and characteristics of access control system 100, access events may include such events as successfully unlocking an electronic locking device, denying an electronic key access to an electronic locking device, movement of an electronic key to a particular area of an access control system, and transmitting certain access control information from one device to another, to illustrate just a few possible examples.

Skilled persons will appreciate that any one of the known methods and techniques of operating and communicating with a suitable electronic locking device may be employed by access control system 100. Accordingly, bi-directional interface 112 may be implemented as a wired communications link, wireless communications link, or combinations thereof utilizing any suitable communications protocols discussed herein. Methods of communicating with and/or operating an electronic locking device via a wired communications link are disclosed for example in U.S. Pat. Nos. 5,140,317 and 6,474,122 (described briefly above). Methods of communicating with and/or operating an electronic locking device via a wireless communications link are disclosed for example in U.S. Pat. Nos. 5,815,557 and 7,334,443.

It is further appreciated by skilled persons that an electronic locking device may be configured without access to a power source. In such configurations, electrical power to energize circuitry of the electronic locking device may be provided by a power source within an electronic key during an unlocking operation or during other key-to-lock communications. For example, electrical power may be supplied to circuitry of an electronic lock during engagement with an electronic key via electrical contacts (where electrical contacts on an electronic key may be electrically coupled with corresponding electrical contacts on the electronic locking device) or by other known methods such as inductive coupling.

While access control system 100 may comprise any suitable electronic locking device known to skilled persons, various embodiments of this disclosure are illustrated as comprising an electronic locking device(s) configured without access to a power source. Accordingly, bi-directional interface 112 is illustrated herein as a wired communications link (or combination of wired and wireless) implemented such that portable electronic key 10 may energize circuitry of electronic locking device 110 according to known methods. As used herein with respect to bi-directional interface 112, the term "wired communications link" indicates that physical engagement (i.e. mechanical coupling) between portable electronic key 10 and electronic locking device 110 may facilitate the energizing of circuitry within electronic locking device 110, for example via electrical contacts disposed on both key and locking device. It will be understood that the term wired communications link is not intended to denote or require a permanent wired connection between portable electronic key 10 and electronic locking device 110. In addition to energizing lock circuitry, in certain implementations bi-directional interface 112 may be further utilized to electronically transmit information such as an access credential to electronic locking device 110. However, it will be appreciated that bi-directional interface 112 may optionally be implemented according to other known methods, including for example as a wireless communications interface that may additionally accomplish energizing circuitry within electronic locking device 110 via inductive coupling or other known methods of wireless energy transfer.

Figure 2A:
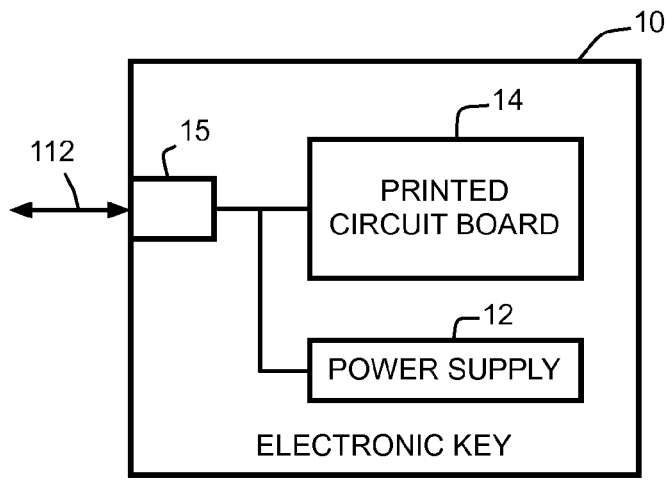
FIG. 2A is a block diagram illustrating an example portable electronic key in accordance with various embodiments.

In accordance with one or more embodiments of this disclosure, a portable electronic key for use in access control system 100 is illustrated generally at 10 in FIG. 2A. It will be understood that this disclosure also refers to "portable electronic key" as simply "electronic key" for brevity, and that the two terms may be used interchangeably. Electronic key 10 comprises a power supply 12 and a printed circuit board (PCB) 14. Optionally, power supply 12 and/or PCB 14 may be electrically coupled to one or more electrical contacts 15. Electrical contacts 15 are preferably disposed such that they are accessible from the exterior of electronic key 10. Skilled persons will appreciate that the overall mechanical and electrical arrangement of electronic key 10 may be implemented as desired.

Figure 2B:
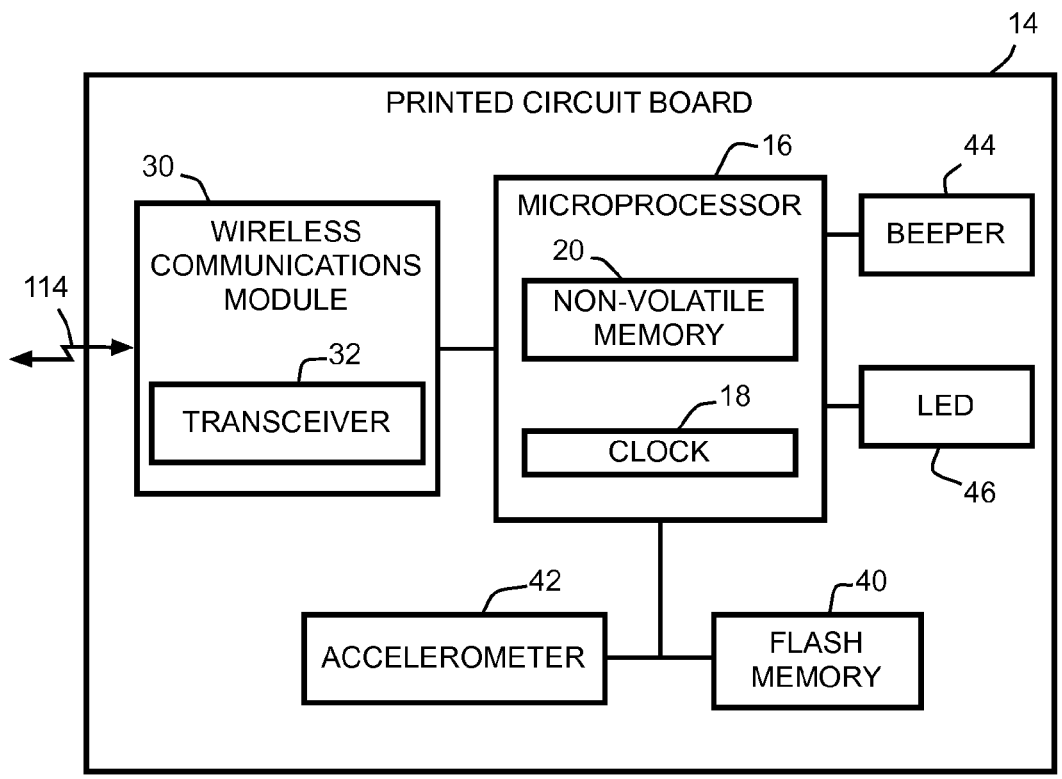
FIG. 2B is a block diagram illustrating an example printed circuit board with functional components embedded thereon for use with a portable electronic key in accordance with various embodiments.

Referring also now to FIG. 2B, PCB 14 has embedded thereon, a microprocessor 16 connected to a plurality of functional components including a wireless communications module 30 and flash memory 40. Additionally, the PCB may optionally have embedded thereon, and connected to microprocessor 16, an accelerometer 42, a beeper 44, and an LED 46. Other functional components may be embedded on PCB 14 as desired. Microprocessor 16 typically includes a clock 18 and non-volatile memory 20 embedded thereon. Wireless communications module 30 may utilize various known methods and protocols of wireless communication including IEEE 802.11x, WI-FI DIRECT®, BLUETOOTH®, ZIGBEE®, NFC, and/or other wireless communication methods and protocols known to skilled persons.

Wireless communications module 30 is shown in FIG. 2B as comprising an embedded transceiver 32, but it will be understood that a transceiver or antenna may be provided in non-embedded configurations and operably connected thereto. It will further be understood that a plurality of wireless communications modules may be included to provide electronic key 10 with wireless communications capabilities utilizing multiple methods and protocols. Appropriate wireless communications modules may be obtained commercially and include that sold under the model number "MRF24WB0MA" by Microchip Technology of Chandler, Ariz. It will be appreciated by skilled persons that other suitable wireless communication circuitry may have utility in electronic key 10.

In addition to non-volatile memory 20 embedded on microprocessor 16, flash memory 40 of PCB 14 may be commercially available flash memory and according to some embodiments is configured to store access control information, such as an audit trail (i.e. log of previous access events, such as details associated with opening of a locking device), access credential (e.g. key permissions, lock schedules, other variables, etc.), and other access control information utilized in the implementation of various embodiments of access control system 100. While electronic key 10 is described herein as containing a plurality of separate memory units (non-volatile memory 20 embedded on microprocessor 16 and flash memory 40), it will be understood that electronic key 10 may utilize any appropriate arrangement of electronic memory sites to store information including a single non-volatile memory unit.

Accelerometer 42 may be any device capable of measuring acceleration forces and may for example comprise a multi-axis accelerometer or alternatively, acceleration forces may be measured by a combination of multiple, single-axis accelerometers. Beeper 44 may be any audio signaling device such as a piezoelectric buzzer and/or other audio signaling devices known to skilled persons. Although FIG. 2B depicts the aforementioned functional components as embedded on PCB 14 and coupled to microprocessor 16, skilled persons will appreciate that in alternate embodiments and implementations, these components may be arranged separately from PCB 14 and operably associated with microprocessor 16 utilizing known methods.

Figure 3:
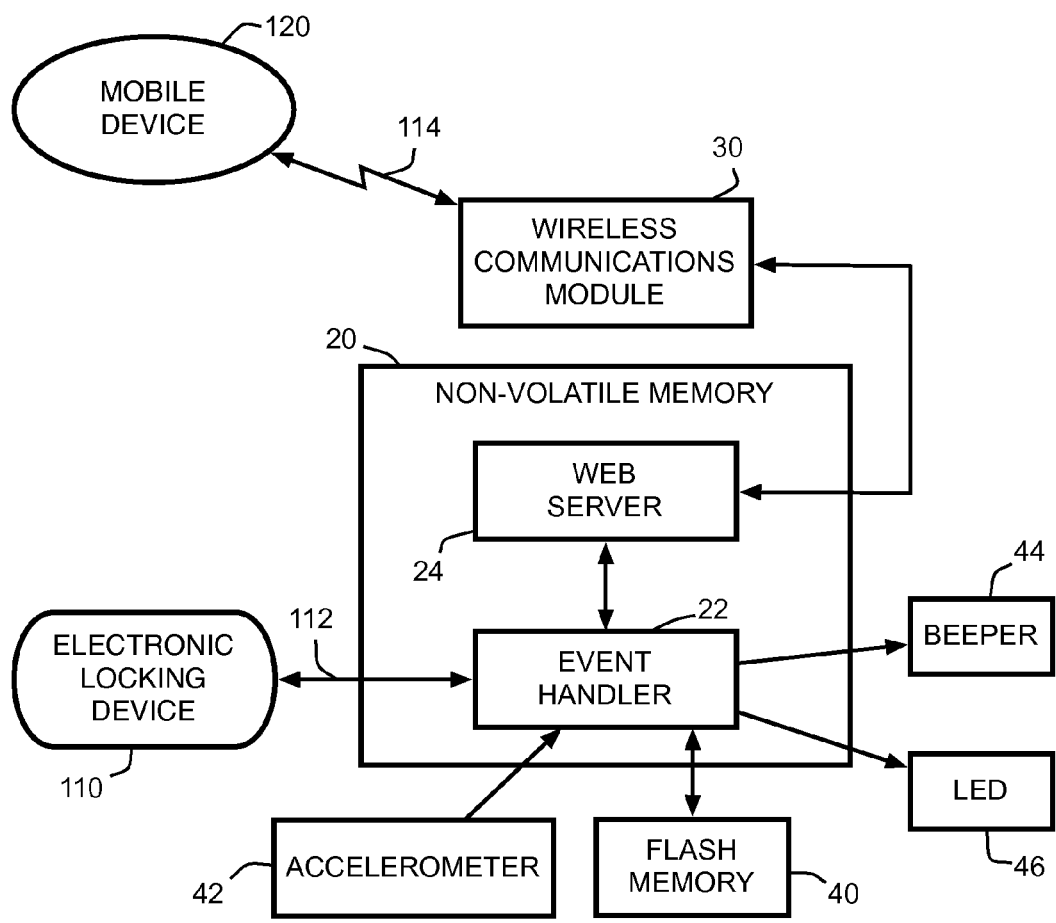
FIG. 3 is a block diagram illustrating an example of communication interfaces between functional components of a portable electronic key and further illustrating example communication interfaces between the portable electronic key and electronic devices located away from the key.

Referring to FIG. 3, non-volatile memory 20 (embedded on microprocessor 16) comprises a software application(s) containing an event handler 22 and a web server 24. While event handler 22 and web server 24 are illustrated as being disposed on the same memory unit, skilled persons will appreciate that event handler 22 and/or web server 24 may be disposed on separate memory units such as flash memory 40. Further, while event handler 22 and web server 24 are illustrated herein as separate software programs, skilled persons will appreciate that this arrangement is illustrative only and that a single software program, or many separate programs, may be configured to perform the various functions of event handler 22 and web server 24. Event handler 22 may be a software program configured to receive, process, and respond to input signals from functional components operably associated with microprocessor 16 such as accelerometer 42. Further, event handler 22 may be configured to receive, process, and respond to input signals from bi-directional interface 112 for example when electronic key 10 is engaged with electronic locking device 110 or with a recharging dock (not shown).

In accordance with some implementations, event handler 22 may respond to various forms of input by selectively controlling access to information stored on electronic key 10, for example in flash memory 40. By way of example, event handler 22 may respond to an engagement event with an electronic locking device 110 by performing an authentication action as described in this disclosure (e.g. by comparing unique ID codes of both key and lock, etc.). As used herein, the term "engagement event" refers to electronic key 10 engaging, pairing, or otherwise communicating with electronic locking device 110 (e.g. for the purpose of initiating an unlocking sequence or exchanging information). In this example, if event handler 22 determines that electronic key 10 is indeed authorized to operate electronic locking device 110, event handler 22 may initiate an unlocking sequence according to known methods as described briefly herein. For instance, in this implementation event handler 22 may retrieve an access credential, such as a unique key ID code and password, stored in flash memory 40 and transmit this information to electronic locking device 110 via bi-directional interface 112. It will be appreciated that the term "access credential" refers to any information that may be utilized by electronic locking device 110 and/or electronic key 10 to authenticate access or operation and may include information such as authorized time and date schedules (i.e. permissions to access certain electronic locking devices at certain times), passwords, ID numbers, etc.

For example, while electronic locking device 110 may require electronic key 10 to possess the proper permissions (i.e. authorization) to initiate an unlocking sequence of that particular locking device, it may require additional information, such as a date/time variable that is compared against a date/time range during which the electronic key 10 is authorized to operate electronic locking device 110. In this example, the access credential may comprise information including the permission to operate the electronic locking device 110 (i.e. electronic key 10 may store a list of electronic locking devices it is authorized to open) as well as the attempted time of operation. In other examples, the access credential may comprise only the access permission. In yet other examples, the access credential may comprise the access permission and information associated with the most recent access event recorded by electronic key 10. Electronic locking device 110 may subsequently compare (e.g. utilizing a microprocessor) the access credential transmitted by electronic key 10 with a list of authorized access credentials, such as key ID codes and passwords, stored in memory of the lock. Upon proper authorization, electronic locking device 110 may perform an unlocking operation, for example by utilizing a solenoid or electric motor therein to displace a lock pin or blocking member.

While authentication and operation of electronic locking device 110 is illustrated herein as comprising an exchange and comparison of an access credential (e.g. ID code, password, and/or time of operation), it will be appreciated by skilled persons that event handler 22 may utilize any known method or technique to operate and/or unlock electronic locking device 110. Alternatively, if event handler 22 determines that electronic key 10 is not authorized to operate the engaged electronic locking device 110 it may alert the user of the key (and potentially persons nearby), that the attempted operation is not authorized, for example by actuating beeper 44 and/or LED 46.

In accordance with alternative implementations, event handler 22 may utilize signals from accelerometer 42 to control, or otherwise alter, communications with electronic locking device 110. To illustrate, upon engagement with electronic locking device 110, event handler 22 may initiate an unlocking sequence (as described herein) if signals produced by accelerometer 42 indicate that electronic key 10 was subjected to a force(s) exceeding a predetermined threshold. In other examples, event handler 22 may initiate an unlocking sequence if signals produced by accelerometer 42 indicate that electronic key 10 was recently subjected to a series of forces matching a particular pattern.

To illustrate further, event handler 22 may be configured in a default state such that it will perform no action in response to an engagement event. As described above, event handler 22 may typically respond to an engagement event by transmitting an access credential to electronic locking device 110 or otherwise initiating an unlocking sequence with electronic locking device 110. However, in this present example, a user of electronic key 10 may first need to subject the key to a particular force(s), movement(s), or orientation such that signals produced by accelerometer 42 will cause event handler 22 to perform an action or otherwise respond to an engagement event.

For instance, event handler 22 may be configured to respond to an engagement event (e.g. by transmitting an access credential or otherwise initiating operation and/or opening of an electronic lock) for a limited period of time after signals produced by accelerometer 42 indicate a particular force typically registered when electronic key 10 is tapped against a hard surface. In this example, tapping electronic key 10 against a solid surface may enable event handler 22 to respond to engagement events (i.e. communicate with electronic locking device 110) for a limited period of time, such as 30 seconds. While tapping the key against a hard surface is one illustration of a particular measurable force, skilled persons will appreciate that any distinguishable force, or pattern of forces, may be utilized to selectively enable response to engagement events, for example a series of taps or a unique vibration sequence.

Skilled persons will further appreciate that enabling event handler 22 for limited periods of time in response to signals from accelerometer 42 is an example illustrating but one method or technique of utilizing signals produced by accelerometer 42 to further control access permissions and event handler 22 may utilize other methods and techniques. In alternative implementations, signals produced by accelerometer 42 may be recorded or logged to a file stored in flash memory 40 or other memory of electronic key 10. During an engagement event, event handler 22 may initially search the file(s) containing recorded accelerometer events to determine whether a particular force, or pattern of forces, was recently recorded, for example within the previous 30 seconds. If the particular enabling force is indeed present in the log of accelerometer events, event handler 22 may thereafter proceed to initiate an unlocking sequence with electronic locking device 110.

In yet further implementations, event handler 22 may disable an otherwise typical default response to engagement events when particular signals are produced by accelerometer 42. Here, event handler 22 may be configured such that it does not perform any action in response to engagement events for a limited period of time after signals produced by accelerometer 42 indicate electronic key 10 was subjected to a particular force or series of forces. In various implementations, event handler 22 may be configured in a default state such that it responds to engagement events by exchanging an access credential or otherwise initiating an unlocking sequence with electronic locking device 110. When event handler 22 receives a signal(s) produced by accelerometer 42 indicative of a particular force or series of forces (e.g. exceeding a predetermined threshold), event handler 22 may deviate from this default state by disabling all responses to engagement events for a period of time, such as 10 minutes.

In this manner, event handler 22 may temporarily disable the access capabilities of electronic key 10 if signals produced by accelerometer 42 indicate that electronic key 10 may have been forcibly taken from its user, for example during a physical altercation. It will be appreciated that other forces or patterns of forces may cause event handler 22 to disable functionality and selection of a particular force or pattern of forces may be subjective and/or may be based, for example, upon physical and environmental forces customarily experienced by electronic key 10 in a particular access control system 100.

In accordance with various implementations, event handler 22 may control and/or communicate with various functional components of electronic key 10 in response to a signal(s) produced by accelerometer 42. For instance, power consumption of electronic key 10 may be reduced by configuring event handler 22 to enable wireless communications module 30 (or other functional components) in response to signals produced by accelerometer 42 indicating movement of electronic key 10. In this manner, power consumption of electronic key 10 may be reduced during periods of time when it is stationary and thus unlikely to be used. Here, wireless communications module 30 may be connected to microprocessor 16 via a serial peripheral interface (SPI) bus with a slave select line or other known method to allow selective enabling/disabling of connected peripherals. To reduce power usage, wireless communications module 30 may be disabled in a default state such that it consumes reduced power or zero power until enabled (e.g. it may be disabled by holding the slave select line high in an active low configuration to interrupt delivery of electrical power to wireless communications module 30). Event handler 22 may thereafter selectively enable wireless communications module 30 by dropping the slave select line (i.e. from logic 1 to logic 0) to deliver electrical power to wireless communications module 30 in response to particular conditions. For example, in some implementations event handler 22 may enable wireless communications module 30 in response to a signal produced by accelerometer 42 indicating movement of electronic key 10. While enabling/disabling of wireless communications module 30 is described herein using a logic gate, it will be appreciated by skilled persons that other known methods and techniques may be used such as an electronic switch or electro-mechanical switch physically manipulated by the user of electronic key 10. It will be further appreciated that similar methods and techniques may be utilized to interrupt the supply of electrical power to other functional components of electronic key 10 in order to reduce overall power consumption.

In an alternative implementation, power consumption may be reduced further yet by configuring event handler 22 to selectively enable wireless communications module 30 in response to a signal produced by accelerometer 42 indicating electronic key 10 was subjected to a force exceeding a predetermined threshold. Here, event handler 22 may, for example, enable wireless communications module 30 for a predetermined period of time after receiving a signal(s) produced by accelerometer 42 indicative of a force equivalent or greater to a force typically registered when electronic key 10 is tapped or knocked against a solid surface (i.e. tapping electronic key 10 against a desk may "wake up" wireless communications module 30 and allow establishment of a wireless communications link with other electronic devices).

Referring to FIGS. 1 and 3, in accordance with various embodiments electronic key 10 may establish a wireless communications link with electronic devices by way of wireless communications module 30. To illustrate, as depicted in FIG. 1, electronic key 10 communicates with mobile device 120 and/or stationary electronic device 130 via a wireless interface 114, for example to facilitate administration of electronic key 10 or access control system 100 via mobile device 120 and/or stationary electronic device 130. Wireless interface 114 may utilize known wireless communications methods and protocols including 802.11x, WI-FI DIRECT®, BLUETOOTH®, ZIGBEE®, NFC, Z-WAVE®, DECT, RUBEE® and/or other wireless communication protocols known to skilled persons. Mobile device 120 may be a conventional cell phone, such as that typically carried by most users, laptop, computer tablet, netbook computer, wearable computer device, or any mobile electronic device capable of communicating via the communication protocols utilized by access control system 100. Likewise, stationary electronic device 130 may be a conventional desktop computer, terminal, wall panel, kiosk, or other fixed or semi-permanent electronic device capable of communicating via the methods and protocols utilized by access control system 100. The number and ratio of devices (e.g. electronic key 10, electronic locking device 110, mobile device 120, stationary electronic device 130, etc.) depicted in FIG. 1 is intended for illustrative purposes only and is not intended to limit the implementation or arrangement of access control system 100.

In some implementations, communications between electronic key 10 and mobile device 120 and/or stationary electronic device 130 may be facilitated by implementing wireless interface 114 over an ad hoc Internet Protocol (IP) WLAN, for example by employing known zero-configuration networking (ZeroConf) protocols. Alternatively, wireless interface 114 may be implemented over an IP WLAN by executing a set of instructions to configure the network settings, by manually configuring a DHCP server and DNS server, or by utilizing other known methods to distribute IP addresses, resolve domain names, and otherwise configure network settings. In this manner, wireless communications module 30 may be utilized to implement an IP WLAN to facilitate communications between electronic key 10 and one or more proximate (effective range will depend on the protocol) electronic devices without reliance on peripheral third party communications infrastructure. Indeed, in this implementation wireless interface 114 may facilitate transmission of information between electronic key 10 and an electronic device utilizing only wireless communications module 30 of electronic key 10 and compatible communications circuitry of mobile device 120 and/or stationary electronic device 130.

While wireless interface 114 is illustrated above as being established over an ad hoc IP WLAN connecting two or more proximate devices, it will be appreciated by skilled persons that other known configurations for establishing a wireless communications link between two or more electronic devices may be utilized, such as a wireless personal area network (WPAN), a wireless wide area network (WWAN), a wireless mesh network, and/or secure device pairing. It will be further appreciated that information in the selected configuration may be transmitted utilizing any known wireless communications protocols such as WI-FI DIRECT®, BLUETOOTH®, ZIGBEE®, NFC, Z-WAVE®, RUBEE®, WiMax (IEEE 802.16) and/or other methods and protocols known to skilled persons. It will be appreciated that communications between electronic key 10 and other devices (via wireless interface 114 or other methods) may optionally be encrypted according to known methods to provide enhanced security.

In other implementations, electronic key 10 may communicate with mobile device 120 and/or stationary electronic device 130 via a communication network 150. Communication network 150 may be any conventional communications network such as a WLAN utilizing protocols such as 802.11x, well known cellular networks utilizing protocols conforming to the $3^{rd}$ Generation Partnership Project (3GPP) specifications (e.g. GSM, UMTS, LTE), CDMA2000, or other wireless communications networks known to skilled persons. In this implementation, wireless interface 114 may be established between electronic key 10 and other devices via communication network 150 such that electronic key 10 may exchange information with any mobile device 120 or stationary electronic device 130 that is similarly communicating across communication network 150, for example devices connected to a company intranet through one or more local area networks. It will be appreciated that mobile device 120 and/or stationary electronic device 130 may communicate via communication network 150 by utilizing wired methods, wireless methods, or a combination thereof. Further, communication network 150 may further be connected to the Internet via an Internet service provider (ISP) according to known methods such that electronic key 10 may exchange information with any mobile device 120 or stationary electronic device 130 that is capable of communicating across the Internet. It will be appreciated by skilled persons that electronic key 10, mobile device 120, stationary electronic device 130, and other electronic devices associated with access control system 100 may utilize various networking devices to facilitate communication and exchange of information, such as a wireless access point, a router, a gateway, a switch, a bridge, a hub, a repeater, a firewall, a multiplexer, and a modem to name a few examples. It will be further appreciated that such networking devices may be embedded on the various electronic devices associated with access control system 100 (e.g. embedded on mobile device 120 and stationary electronic device 130), or may alternatively be located remote from such electronic devices and operably associated thereto utilizing the methods and protocols described herein.

Referring again to FIG. 3, in accordance with numerous embodiments web server 24 is a software program configured to receive and respond to electronic data requests, such as HTTP requests (or data requests using other application protocols known to skilled persons) from a conventional web browser. Other protocols that may have utility for sending and responding to requests in this and other embodiments are those protocols in accordance with layer 7 of the International Organization for Standardization's Open Systems Interconnection (OSI) model. Skilled persons will appreciate that the request portion and response portion of an HTTP request-response transaction may be referred to as messages. HTTP is used herein to refer collectively to HTTP as well as its secure format, HTTPS. For example, a system user or system administrator may utilize a conventional web browser running on mobile device 120 or stationary electronic device 130 to transmit an HTTP request message to electronic key 10 via the communication methods and protocols described herein. The web browser may be any commercially available web browser capable of transmitting HTTP requests or other data requests over the Internet such as that distributed under the name "CHROME" by Google, Inc. of Mountain View, Calif., or under the trademark FIREFOX® by Mozilla Corporation also of Mountain View, Calif. While this disclosure refers to the use of a conventional web browser to illustrate various embodiments and implementations, skilled persons will appreciate that other client applications (e.g. custom proprietary applications) may be used to send electronic data request messages to web server 24.

Likewise, web server 24 may be obtained commercially and appropriate examples include that distributed under the name "Apache HTTP Server" by the Apache Software Foundation of Forest Hill, Md. Alternatively, web server 24 may be a proprietary application configured to receive and respond to electronic data requests such as HTTP request messages. Skilled persons will appreciate that software programs configured to receive and respond to electronic data requests may often be configured to operate as both a client (to generate and send electronic data request messages) and as a server (to receive and respond to electronic data request messages) in a client-server relationship with another application. Electronic key 10 is illustrated in various embodiments as having a web server 24, but it should be understood that the term "web server" is used herein for brevity and web server 24 may be any software program configured to operate as a client, as a server, or a combination thereof. Web server 24 may cooperate with event handler 22 to process (and alternatively, to generate) data request messages. In some implementations, event handler 22 may process a data request and prepare a response message for return to web server 24 utilizing information stored in flash memory 40 and/or non-volatile memory 20.

To illustrate by way of example, a system administrator may send an HTTP request message from a conventional web browser running on mobile device 120 to electronic key 10 via wireless interface 114. The HTTP request message may, for example, comprise instructions requesting audit trail information (i.e. details of previous access events) of electronic key 10, or audit trail information corresponding to all keys deployed in access control system 100. Web server 24 handles the data request and communicates the information contained in the request message to event handler 22 to prepare a response message for transmission to the web browser on mobile device 120. In some implementations, event handler 22 may initially authenticate the administrator (or other user initiating the HTTP request) prior to preparing a response message, for example utilizing digest access authentication or other known challenge-response protocols.

To illustrate further, when processing the HTTP request, event handler 22 may first determine whether the requested audit trail information exists in memory 40 and/or non-volatile memory 20. Optionally, event handler 22 may communicate with an embedded database server (not shown) or other file management program where files stored on electronic key 10 are organized according to such architectures. If event handler 22 determines that the requested audit trail information does not exist on electronic key 10, the event handler may prepare an error message for return to web server 24 which in turn transmits this error message to the web browser, for example as an HTML page or other browser compatible text format. Alternatively, if the requested audit trail information does indeed exist in memory, event handler 22 may pass this information directly to the web browser via web server 24 (e.g. if the requested information is stored on electronic key 10 in a static HTML document). In another implementation, event handler 22 may prepare a dynamic HTML web page containing the requested audit trail information for return to web server 24 utilizing known methods and techniques such as server-side scripting. Further, event handler 22 may cache dynamic web pages to reduce load times when responding to subsequent requests.

In yet another implementation, event handler 22 may prepare responses in XML, JSON, or other known formats suitable for transmitting information between server and client. For instance, known web development techniques such as Asynchronous Javascript and XML (AJAX) may be utilized in the implementation of a web application (or interactive webpage) providing a user friendly graphical user interface (GUI) displaying access control system information and details on the web browser. In this manner, a user of the web browser is able to perform administration duties for an access control system using the interface provided on the web browser. Here, event handler 22 may initially respond to an HTTP request message by preparing a response message containing static resources utilized by the web browser to build or assemble a web application. These static resources may comprise a file(s) containing various languages and formats capable of being handled by a conventional web browser such as HTML, JAVASCRIPT®, CSS, etc. After the web browser utilizes these static resources to build a web application, additional asynchronous (or background) HTTP request messages may be generated and sent automatically from the web browser to update information displayed at the web application, preferably without reloading the page or application. For instance, after initially displaying audit trail information for a particular electronic key 10 at the web application, additional asynchronous HTTP request messages may be sent to electronic key 10 such that any change to the audit trail of the key would thereafter be transmitted to the web browser to automatically update the audit trail information displayed at the web application, preferably without reloading or modifying the other resources displayed. In this implementation, event handler 22 may prepare a response (to asynchronous HTTP request messages) containing the requested audit trail information in JSON, XML, or other known textual data formats.

In further implementations, event handler 22 may create, modify, copy, replace or delete files stored in flash memory 40 or non-volatile memory 20 in response to an HTTP request message. To illustrate, in an emergency situation a system administrator may send an HTTP request message from a web browser on mobile device 120 to electronic key 10 containing instructions to delete or otherwise disable the access credential(s) for that particular electronic key. In response, event handler 22 may delete the file(s) containing the access credential from flash memory 40 before returning a response message comprising an HTML page to web server 24 (for transmission to the web browser) indicating that the requested action was performed successfully. In this example where an access credential was deleted, the system administrator may reprogram or otherwise provide new access permissions and/or other access credential information to electronic key 10 in order to thereafter operate electronic locking device 110.

In another aspect, a system administrator may replace an obsolete file(s) stored on electronic key 10 by utilizing a web browser or other client program to transmit an updated version of the file(s) along with an HTTP request message containing instructions to replace the obsolete file(s), stored in flash memory 40 or non-volatile memory 20, with the transmitted file. In response, event handler 22 may initiate a replacement of the obsolete file and return an HTML page (or other data) to web server 24 indicating the requested replacement was performed successfully.

In a further example, a system administrator running a web application on a conventional web browser may send an HTTP request message to electronic key 10 containing a request to retrieve, for display, the access credential for that particular electronic key. After loading the credential information (as transmitted by electronic key 10) at the web application, the web application may provide the system administrator with the ability to adjust the access credential, for example by modifying the times during each day that electronic key 10 is authorized for use by a particular user. If the system administrator modifies the authorized time frame, for example by clicking on button(s) or moving sliders within the web application's GUI to increase or decrease the authorized time frame, the web browser may send asynchronous request messages to web server 24 containing instructions to modify the access credential accordingly. In this example, event handler 22 may respond by modifying the file(s) containing the access credential for electronic key 10 stored, for example, in flash memory 40 before returning an XML or JSON file containing the modified access credential information. The web application running on the system administrator's web browser may process the XML or JSON file and appropriately update the page resources (which may be comprised of a combination of web browser compatible languages and protocols including, for example, HTML, JAVASCRIPT®, CSS, etc.) in real-time such that the system administrator may view the newly modified credential, preferably without reloading the web application or otherwise interrupting display of page resources.

According to some implementations, event handler 22 may communicate with and/or control functional components of electronic key 10 in response to messages received at the key. For example, event handler 22 may initiate an alarm by actuating beeper 44 and/or LED 46 before returning a response message to web server 24. In another example, event handler 22 may conserve power by disabling wireless communications module 30 immediately after web server 24 successfully returns a response message to the web browser. In yet other examples, event handler 22 may communicate with and/or control functional components of electronic key 10 without preparing any response message to return to the web browser.

Figure 4:
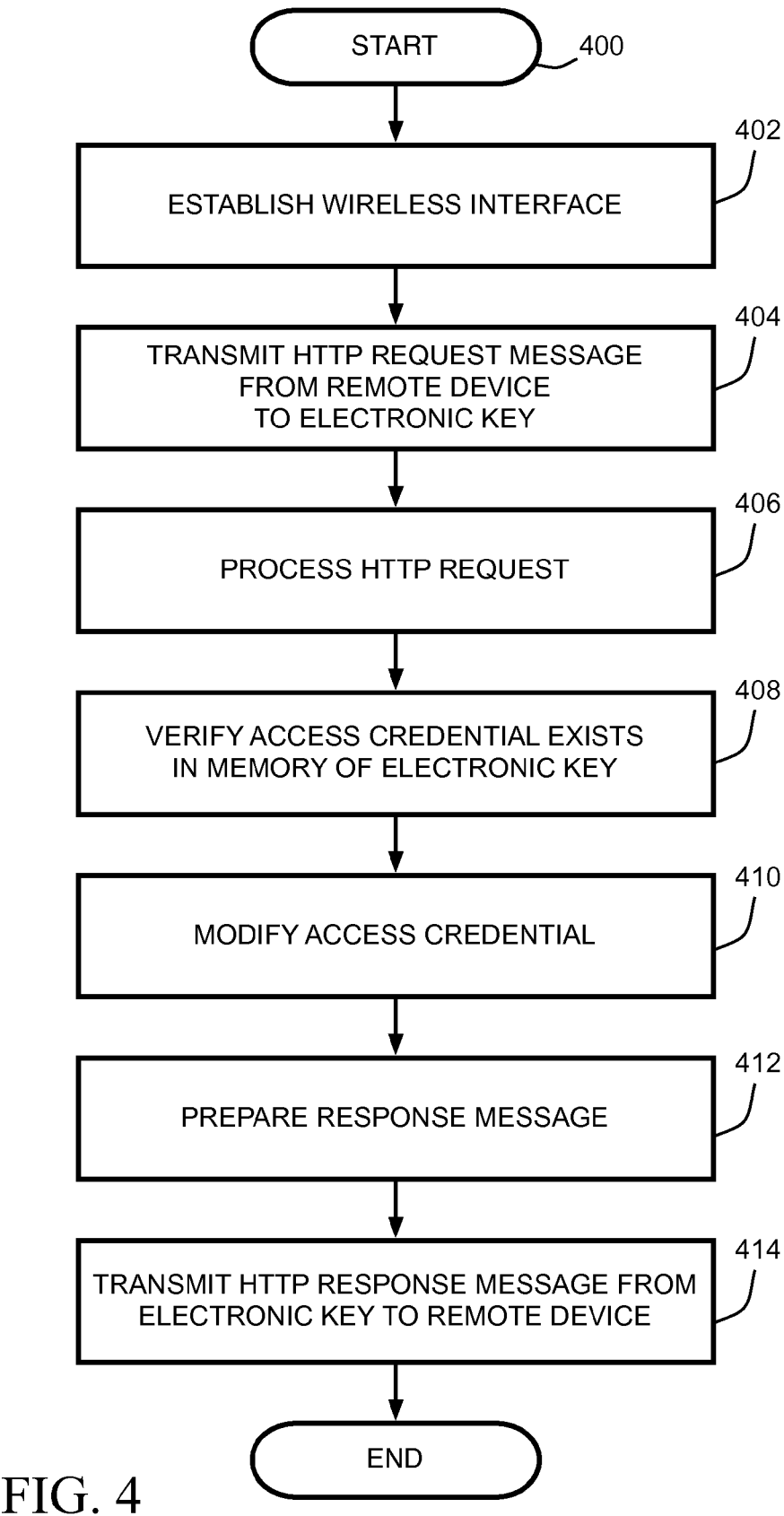
FIG. 4 is a flowchart illustrating an example method for utilizing a conventional web browser on an electronic device to modify access control information of a portable electronic key.

Referring here to FIG. 4, a method for modifying access credential information of an electronic key 10 deployed in access control system 100 will be described in accordance with at least some embodiments. The process begins at step 400 and proceeds to step 402 where wireless interface 114 is established between electronic key 10 and mobile device 120. At step 404, an HTTP request message containing instructions to modify access credential information for electronic key 10 is transmitted from a web browser running on mobile device 120 to electronic key 10 via wireless interface 114. Web server 24 processes the HTTP request message and communicates the information contained therein to event handler 22 at step 406. In step 408, event handler 22 may first verify that a file(s) containing a valid access credential exists in flash memory 40. If such a file(s) exists in memory, event handler 22 may proceed to step 410 where the access credential is modified in accordance with instructions contained in the received HTTP request message. At step 412, notwithstanding whether the access credential was actually modified, event handler 22 prepares a response message to pass to web server 24. Here, the response may, for example, be an HTML file containing the access credential as modified in step 410. Alternatively, the response may be a file containing an error message where the requested modification of the access credential was unsuccessful. At step 414, event handler 22 passes the prepared response message to web server 24, which subsequently transmits the response message, via wireless interface 114, to the web browser running on mobile device 120.

Power consumption during communications between electronic key 10 and various electronic devices may be reduced by configuring event handler 22 to disable wireless communications module 30 where wireless interface 114 is not established within a predetermined period of time after the module has been enabled (i.e. if a device has not established a communications link, or attempted to establish a communications link, with electronic key 10). In other embodiments, power consumption of electronic key 10 may be reduced by configuring functional components in a default low power or sleep state and thereafter selectively enabling said components in response to a signal(s) from accelerometer 42. For instance, a user of electronic key 10 may need to subject electronic key 10 to a particular force or pattern of forces in order to activate functional components, such as wireless communications module 30. In this manner, a user of electronic key 10 may actively conserve power by enabling functional components only when needed, for example immediately before or shortly after attempting an engagement event.

Figure 5:
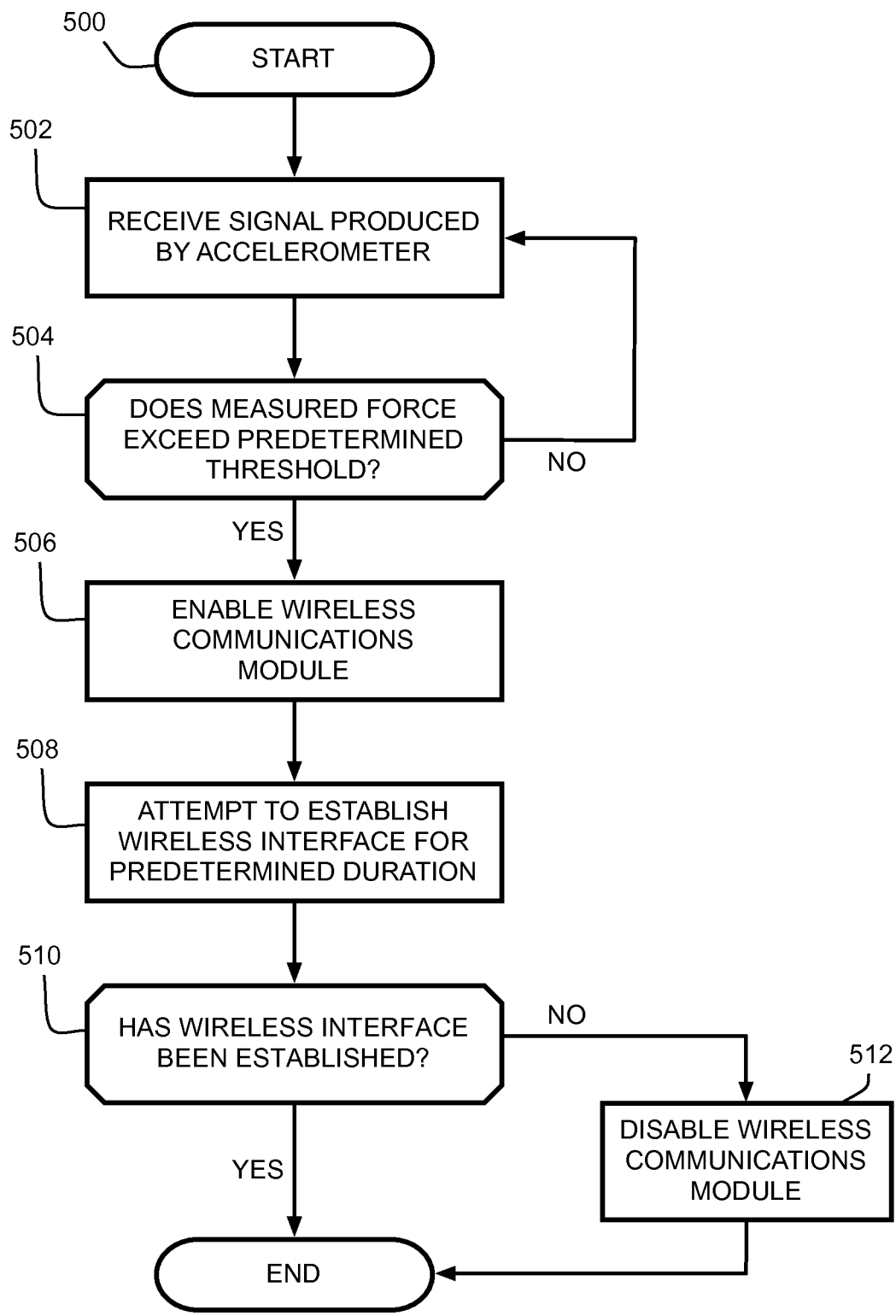
FIG. 5 is a flowchart illustrating an example of an energy efficient method for establishing a wireless communications interface with a portable electronic key.

Referring now to FIG. 5, an energy efficient method for establishing a wireless communications link with an electronic key will be described in accordance with at least some embodiments. The method is initiated at step 500 and proceeds to step 502 where event handler 22 receives a signal(s) produced by accelerometer 42 and determines what forces, if any, electronic key 10 has been subjected to. If event handler 22 determines that signals produced by accelerometer 42 indicate that forces acting on electronic key 10 exceed a predetermined threshold in step 504, the method proceeds to step 506 where event handler 22 enables wireless communications module 30. For example, in some implementations the predetermined threshold may be established, in part, based on forces typically registered when electronic key 10 is subjected to a tapping or knocking against a solid surface such as a desk. However, if event handler 22 determines that forces acting on electronic key 10 have not exceeded a predetermined threshold, step 502 is repeated indefinitely until event handler 22 determines that forces acting on electronic key 10 have exceeded a predetermined threshold. After wireless communications module 30 has been enabled, event handler 22 thereafter attempts (or responds to attempts generated by other electronic devices) to establish wireless interface 114 with other devices associated with access control system 100 for a predetermined period of time in step 508. In this step 508, event handler 22 may for example respond to a request from a compatible communications module on mobile device 120 by attempting to establish wireless interface 114 via wireless communications module 30. In other examples of step 508, event handler 22 may attempt to connect to a WLAN using network credentials stored in flash memory 40. After expiration of the predetermined time in step 508, the method proceeds to step 510 where event handler 22 determines whether wireless interface 114 has been established between electronic key 10 (via wireless communications module 30) and another device or communication network 150. If event handler 22 determines that wireless interface 114 has not been established, event handler 22 disables wireless communications module 30 in step 512. Skilled persons will appreciate that similar methods may be used to conserve power consumption or control behavior of other functional components. For instance, event handler 22 may only initiate an engagement event with electronic locking device 110 after event handler 22 determines that signals produced by accelerometer 42 indicate electronic key 10 was subject to a force exceeding a predetermined threshold.

Figure 6:
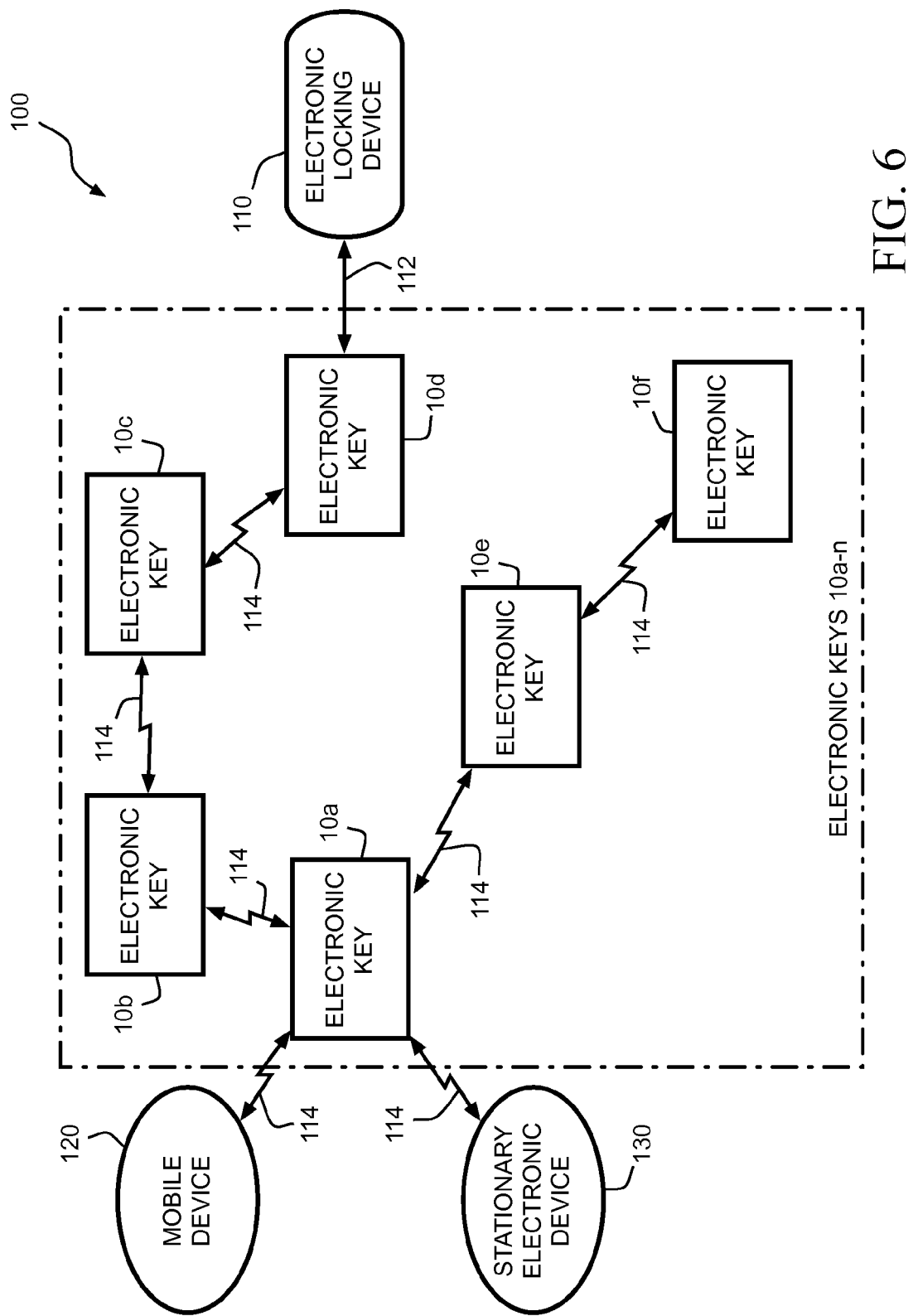
FIG. 6 is a block diagram illustrating example communications between a set of two or more portable electronic keys deployed in an access control system.

Turning now to FIG. 6, in accordance with various embodiments, a set comprising two or more electronic keys $10_{a-n}$ deployed in access control system 100 may establish a wireless communications link with one another via wireless communications module 30. In this manner, each electronic key 10 may effectively operate as a proxy administrator or master key by passively updating other keys (e.g. by modifying an access credential with new permissions). For example, in an illustrative access control system 100, each individual electronic key $10_{a-n}$ may initially have stored thereon (e.g. in flash memory 40) a file(s) comprising an identical access credential, or set of credentials, applicable to all electronic keys $10_{a-n}$ in access control system 100. The system administrator, wishing to update access permissions for a particular individual electronic key (e.g. $10_d$) may conveniently establish a wireless communications link between an electronic device and any available electronic key $10_{a-n}$ in the system (according to methods described herein). For example, the system administrator may establish wireless interface 114 between mobile device 120 and electronic key $10_a$ and subsequently update the access credential corresponding to a different electronic key, such as $10_d$, stored thereon. Updating of the access credential may be accomplished according to the various methods and techniques described herein, such as for example sending an HTTP request message containing instructions to modify the permissions for a particular key.

The file(s) containing the newly updated access permissions, now stored on electronic key $10_a$, may further contain a time stamp or other appropriate variable to indicate the time and date that the file(s) was modified. Subsequently, when an administrator or user transports updated electronic key $10_a$ throughout access control system 100, event handler 22 of electronic key $10_a$ may selectively enable wireless communications module 30 and thereafter attempt to establish wireless interface 114 with one or more electronic keys $10_{a-n}$.

As with wireless communications between electronic key 10 and mobile device 120 and/or stationary electronic device 130, implementation of wireless interface 114 between two or more electronic keys $10_{a-n}$ may utilize any appropriate wireless communications protocols such as 802.11x, WI-FI DIRECT®, BLUETOOTH®, ZIGBEE®, NFC, Z-WAVE®, RUBEE®, and/or other methods and protocols known to skilled persons. Further, information may be exchanged between keys in formats identical or equivalent to those utilized when communicating with a web browser or other application on mobile device 120 and/or stationary electronic device 130. For instance, electronic key 10 may request information from other electronic keys $10_{a-n}$ by transmitting, via wireless interface 114, an HTTP request message (or other electronic data requests known to skilled persons). An electronic key 10 receiving an HTTP request message may thereafter respond by transmitting information (e.g. response messages) via wireless interface 114 to other electronic keys $10_{a-n}$ utilizing XML, JSON, HTML or other known textual data protocols.

Upon establishment of wireless interface 114 between two or more electronic keys, for example between electronic key $10_a$ and electronic key $10_b$, event handler 22 (on either key) may initiate an information exchange between the keys. For example, event handler 22 on electronic key $10_a$ may update the access credential stored on electronic key $10_b$ by first requesting (e.g. transmitting an HTTP request message via web server 24) wirelessly connected electronic key $10_b$ transmit its access credential file(s). Event handler 22 on electronic key $10_b$ may respond by transmitting the file(s) via web server 24 and wireless interface 114. Upon receipt of the access credential file(s), event handler 22 on electronic key $10_a$ may run a comparison on the time stamps (or similar variable indicating time of file modification), comparing the time stamp contained in the access credential file(s) stored locally on electronic key $10_a$ with that contained in the file(s) received from electronic key $10_b$. If event handler 22 determines that the access credential file(s) transmitted by electronic key $10_b$ predates the access credential file(s) stored in memory of $10_a$, event handler 22 of key $10_a$ may initiate a replacement of the outdated file by transmitting the most recent access credential file(s) via wireless interface 114 to electronic key $10_b$. Thereafter, electronic keys $10_a$ and $10_b$ may similarly initiate communications with other electronic keys $10_{a-n}$ such that all deployed keys in access control system 100 receive the updated access credential file(s) as originally updated, by the administrator, on electronic key $10_a$.

Enablement of wireless communications module 30 to facilitate communications between electronic keys $10_{a-n}$ may occur automatically or in response to user action. To illustrate, event handler 22 of each electronic key $10_{a-n}$ may be configured to enable its respective wireless communications module 30 at synchronized intermittent times, for example every 30 minutes. Alternatively, event handler 22 may enable wireless communications module 30 if a signal(s) produced by accelerometer 42 indicates that electronic key 10 is not stationary. In this manner, electronic keys $10_{a-n}$ may communicate with one another during transportation or movement of keys throughout access control system 100.

In further implementations, event handler 22 of each electronic key 10$_{a-n}$ may enable its corresponding wireless communications module 30 during synchronized time periods and thereafter attempt to establish a wireless communications link via communication network 150 (not shown in FIG. 6), thus enabling all electronic keys 10$_{a-n}$ in access control system 100 to communicate with one another irrespective of relative proximity.

In yet further implementations, administrators or users of electronic keys 10$_{a-n}$ may actively induce establishment of wireless interface 114 between two or more electronic keys by subjecting electronic key 10 to a particular motion and/or force. To illustrate, users of two electronic keys deployed in access control system 100, such as electronic key 10$_a$ and 10$_b$, may induce communications between electronic keys 10$_{a,b}$ by tapping the two keys together. Here, event handler 22 (on each key 10$_{a,b}$) may be configured to enable wireless communications module 30 in response to a signal(s) produced by accelerometer 42 indicating electronic key 10 was subjected to a force exceeding or matching a predetermined threshold, such as that typically registered when electronic key 10 is tapped against a solid surface. While tapping the two keys together is one example of force applied by the user, skilled persons will appreciate that event handler 22 may be configured to enable wireless communications module 30 in response to any distinguishable force or motion experienced by electronic key 10. To conserve power in various implementations, event handler 22 may be configured such that wireless communications module 30 is enabled for a brief period to establish wireless interface 114 between electronic keys. If wireless interface 114 is not established during this brief period, wireless communications module 30 may be disabled (similar to the technique described above with reference to FIG. 5). Optionally, event handler 22 may alert users of successful and/or unsuccessful establishment of wireless interface 114 (and for example, success and/or failure of subsequent communications) by actuating beeper 44 and/or LED 46 such that users may reliably ascertain whether a particular key has been updated with a new credential or system information.

It will be appreciated by skilled persons that electronic keys 10$_{a-n}$ may optionally communicate with other electronic devices in the same automated, or semi-automated, manner as they communicate with one another (i.e. where user or administrator input is limited or absent). To illustrate, electronic key 10 may be configured to operate in the manner of a client device in access control system 100, thereby allowing administration or updating of electronic key 10 while reducing power consumption by operating in a client-server relationship with other devices. In this client-server relationship, electronic key 10 may be configured in a default low power (or sleep state) wherein wireless communications module 30 and other functional components are disabled or otherwise consume reduced, minimal, or zero power. Here, for example, event handler 22 may periodically enable wireless communications module 30 and thereafter attempt to establish wireless interface 114 with a dedicated system server operating on an electronic device that is connected to a building WLAN and located away from electronic key 10. For example, wireless interface 114 may be established while a user carries electronic key 10 throughout various locations of access control system 100. Upon establishment of wireless interface 114, event handler 22 may be configured to automatically retrieve an updated access credential from the system server to replace or modify its own access credential file(s) in the same manner described above with respect to key-to-key communications.

In other implementations, event handler 22 may report access events logged by the key to the system server. In this manner, event handler 22 may automatically (e.g. without user input) manage access credentials on the key and report previous access events to the system server. Here, as above with respect to key-to-key communication, web server 24 may be a software program configured to both generate and send electronic data request messages (e.g. HTTP request messages) as well as receive and respond to electronic data request messages. For example, in addition to being configured as a client device (where web server 24 is typically generating request messages), electronic key 10 could alternatively be configured as a server device, and a remote client device may periodically query electronic key 10 to retrieve access events stored thereon. In this instance, web server 24 would typically be responding to received request messages and communicating with event handler 22 to prepare the appropriate responses.

Figure 7:
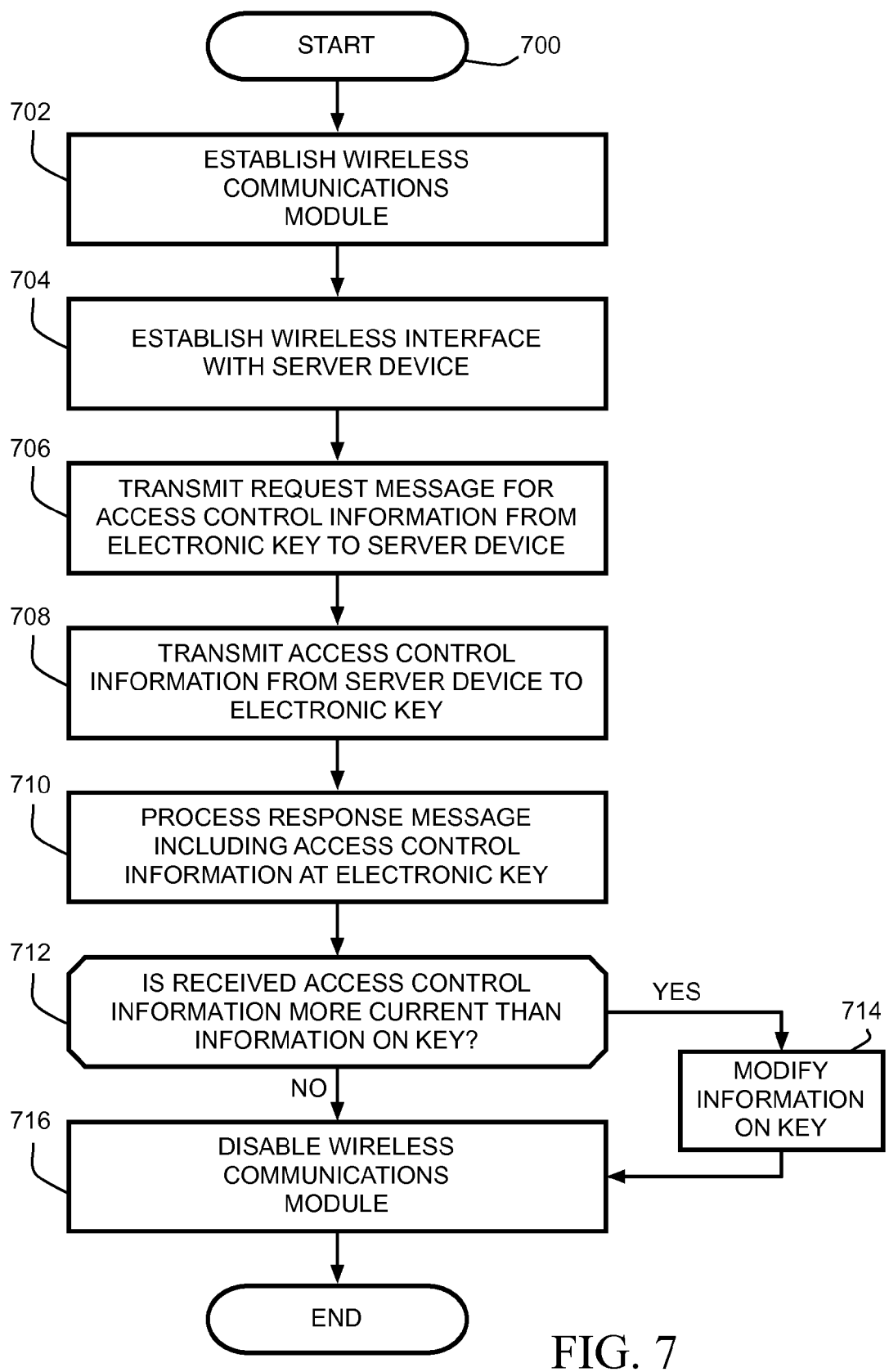
FIG. 7 is a flowchart illustrating an example method for automatically updating access control information of a portable electronic key configured to operate in a client-server relationship with a remote server device.

Referring to FIG. 7 to illustrate further, a method for automatically (e.g. without input or action from a user of the key) updating access control information of an electronic key configured to operate in a client-server relationship with a remote server device will be described in accordance with at least some embodiments. The method is initiated at step 700 and proceeds to step 702 where event handler 22 enables wireless communications module 30. Depending on the arrangement and characteristics of the access control system 100, event handler 22 may be configured to enable wireless communications module 30 with varying degrees of frequency. In some implementations of step 702, event handler 22 may enable wireless communications circuitry at predetermined periodic intervals, such as every 10 minutes. It will be appreciated that the periodic intervals may vary in duration depending on the characteristics of access control system 100. For instance, during certain hours of the day the intervals may be of shorter duration to facilitate increased control and visibility during peak access control system traffic. In other implementations of step 702, event handler 22 may enable wireless communications module 30 based, at least in part, on previous access events. For instance, after electronic key 10 successfully unlocks electronic locking device 110, event handler 22 may enable wireless communications module 30 at one-minute intervals for a predetermined period of time.

After wireless communications module 30 has been enabled, the method proceeds to step 704 where event handler 22 attempts to establish wireless interface 114 with a device associated with access control system 100. According to various embodiments, event handler 22 may for example attempt to establish wireless interface 114 with a device configured to behave as an access control information server for access control system 100. For instance, a device configured to behave as a system server may store a master copy of access control information associated with all devices in access control system 100. In this example, an administrator or user may modify access control information stored on the server for subsequent distribution to other devices in access control system 100. In this manner, the system server performs automated updating and/or administration of client devices located anywhere within access control system 100 when the client devices, such as electronic keys 10$_{a-n}$, "check in" with the server.

After wireless interface 114 is established in step 704, the method proceeds to step 706 where event handler 22 initiates transmission of a request message (e.g. HTTP) to the server device (via wireless interface 114), the request message including an instruction for the server device to transmit, to electronic key 10, current access control information.

For example, the server device may transmit the most recently modified access credential for electronic key 10. In other examples of step 706, the server device may transmit audit trail information (e.g. details of previous access events) associated with other keys in access control system 100 to facilitate redundancy by maintaining multiple copies of access control information in different locations of access control system 100. In step 708, the server device transmits a response message to electronic key 10 comprising access control information that is responsive to the request message sent from electronic key 10 in step 706. The method then proceeds to step 710 where web server 24 processes the response message sent in step 708 and passes the access control information included in the response message to event handler 22. In step 712, event handler 22 determines whether the access control information received from the server device was updated more recently (i.e. is more current) than corresponding access control information stored in flash memory 40 of electronic key 10. For instance, where the access control information transmitted in step 708 includes an access credential for electronic key 10, event handler 22 may compare the time of modification for the access credential stored in flash memory 40 with that of the access credential received from the server device. If the access credential received from the server device was modified more recently, the method proceeds to step 714 where event handler 22 replaces (or modifies) the access credential stored in flash memory 40 with the updated information received from the server device before disabling wireless communications module 30 in step 716. Upon completion of the method, electronic key 10 may optionally alert a user that access control information of electronic key 10 was updated or modified. In this manner, electronic key 10 may automatically receive updated access control information while moving throughout access control system 100 and without any action or cooperation by the user of electronic key 10. This is particularly advantageous where the user of electronic key 10 may prefer to avoid updating access control information, for example where the electronic key 10 is lost or stolen.

In a further example, a device configured to behave as a system server may store access control information for all electronic keys in access control system 100. Here, event handler 22 of electronic key 10 may send an HTTP request message to the server device including an instruction for the server device to respond with the most recent access events associated with electronic key 10. In this example, upon receipt of the response message from the server device, event handler 22 may be configured to compare the access events transmitted by the server device with a record of access events performed by electronic key 10. If event handler 22 determines that electronic key 10 has performed access events more recently than the access events reported by the server device, event handler 22 may transmit all access events performed by electronic key 10 to the server device (or alternatively, all access events completed after a particular date and time), thereby updating at the server device, the details of access events associated with electronic key 10.

In other implementations, a particular electronic key 10 may serve as a dedicated server/administrator key, for example operating to update other electronic keys $10_{a-n}$. Event handler 22 on a dedicated server key may be configured such that wireless communications module 30 is uninterruptedly enabled, or enabled more often than typical keys deployed in the system, to increase opportunities to connect with other electronic keys $10_{a-n}$ that are configured to behave as clients.

In accordance with at least some embodiments, event handler 22 may be configured to operate in an emergency mode with modified behavior. The threshold for what constitutes an emergency may depend wholly, or in part, on the arrangement and characteristics of access control system 100. For example, event handler 22 may be configured to enter an emergency mode when a signal(s) produced by accelerometer 42 indicates movement of electronic key 10 exceeding a predetermined velocity or speed (e.g. if the user of an electronic key was sprinting or operating a vehicle when this would not be customary behavior for a user in this particular access control system 100). In other implementations, event handler 22 may be configured to enter an emergency mode if a signal(s) produced by accelerometer 42 indicates electronic key 10 has remained stationary for an extended period of time (e.g. when the user in this particular access control system 100 is typically in motion). Additionally, a system administrator or user may manually instruct an electronic key 10 to enter emergency mode via mobile device 120 and/or stationary electronic device 130, for example by utilizing a web browser to send an HTTP request message (directly to the key or to a server in periodic communication with the key) comprising instructions to enter emergency mode.

In emergency mode, event handler 22 may be configured to temporarily or permanently disable or revoke all access credentials for electronic key 10. For instance, in emergency mode event handler 22 may be configured such that it will perform no action in response to an engagement event (i.e. electronic key 10 may not operate any locking device while in emergency mode). Further, event handler 22 may automatically enable wireless communications module 30 during emergency mode such that a system administrator or user may quickly monitor access events and/or control permissions of electronic key 10. For example, a system administrator may utilize a web browser on mobile device 120 to send an HTTP request message containing instructions to modify or delete the access credential of electronic key 10 operating in emergency mode. Optionally, event handler 22 may initiate an alarm or other indication that electronic key 10 has entered emergency mode, for example by actuating beeper 44 and/or LED 46.

Event handler 22 may continue to operate in emergency mode for a predetermined duration. Optionally, event handler 22 may operate in emergency mode until a signal(s) produced by accelerometer 42 is indicative of a predetermined force (e.g. tapping the key twice on a table may disable emergency mode). Still further, an administrator or user may instruct electronic key 10 to exit emergency mode for example by sending an HTTP request message from an application on a remote device such as mobile device 120.

Additional implementations of communications may be illustrated by way of examples of emergency situations. For instance, in emergency mode event handler 22 may be configured to enable wireless communications module 30 and thereafter uninterruptedly or periodically attempt transmission of an access credential file(s) containing master permissions (i.e. permission to open all access points in access control system 100) to all electronic keys $10_{a-n}$. In this manner, users of the electronic keys $10_{a-n}$ receiving the master permissions may thereafter operate all access points in access control system 100 to better respond to the emergency. In this example, each electronic key $10_{a-n}$ in access control system 100 may have a master file(s) stored thereon containing an access credential with permissions to open all electronic locking devices in the system. A master file(s) may, for example, not be accessible by event handler 22 unless it is operating in emergency mode.

In an alternative implementation, event handler 22 of an electronic key 10 operating in emergency mode may be configured to disable/revoke its own access credential while additionally transmitting master permissions to all other electronic keys $10_{a-n}$. Further, event handler 22 may be configured to transmit information to other electronic keys $10_{a-n}$ containing instructions to enter emergency mode.

In other examples of emergency situations, event handler 22 of an electronic key 10 operating in emergency mode may be configured to attempt to establish wireless interface 114 between electronic key 10 and a dedicated server key or dedicated system server operating on a remote device and report the emergency mode status of electronic key 10 such that an administrator or other users may be alerted. The dedicated server key or system server may respond, for example, by revoking the access credential for electronic key 10 or by transmitting instructions to enter emergency mode to all other electronic keys $10_{a-n}$ deployed in access control system 100.

In yet further examples of emergency situations, where a system administrator or user identifies a particular electronic key 10 as stolen or otherwise being operated improperly, the administrator or user may manually revoke the access credential for the identified key via a web browser on mobile device 120 or stationary electronic device 130. The administrator may accomplish this by establishing wireless interface 114 with the stolen key directly and updating the access permissions or other access credential information stored thereon (e.g. by sending an HTTP request message or by other methods described herein). Alternatively, where event handler 22 is configured to disable/revoke the access credential upon entering emergency mode, the administrator may simply instruct the stolen key to enter emergency mode.

In situations where a stolen or lost key is unavailable for communication (e.g. if the key is too distant to establish wireless interface 114 and/or not connected to a WLAN) an administrator or user may disable the stolen key by utilizing key-to-key communications as described above. In this example, each electronic key 10 in the set of electronic keys $10_{a-n}$ may be configured to store, in memory, a copy of the access credential for every other key in access control system 100. To illustrate further, an administrator may establish wireless interface 114 with any available electronic key $10_{a-n}$ in access control system 100 to modify and/or revoke the access credential for the stolen key stored on the available key. For instance, where electronic key $10_c$ was stolen, the administrator may establish wireless interface 114 with available electronic key $10_e$ and thereafter modify the access credential for stolen electronic key $10_c$. Electronic key $10_e$ containing the newly modified access credential for stolen electronic key $10_c$ may then initiate a replacement of obsolete access credential information stored on other electronic keys $10_{a-n}$ utilizing the methods described herein. The efficiency of key-to-key communications may be enhanced during emergency mode by configuring event handler 22 to increase the frequency of communication attempts and/or to increase the frequency or duration that wireless communications module 30 is enabled and available for communications. Similarly, an administrator could employ a similar method by updating access credential information on a device configured to operate as a system server in access control system 100. In this example, electronic keys $10_{a-n}$ may be configured to operate as client devices, periodically exchanging messages related to access control information with the server device. Here, the administrator may conveniently update access credential information for stolen electronic key $10_c$ as stored on the server device (e.g. by sending an HTTP request from a web browser to the server device or via other methods as described herein). Thereafter, as electronic keys $10_{a-n}$ periodically exchange messages with the server device, the updated access credential information for stolen electronic key $10_c$ will be distributed throughout access control system, eventually reaching stolen electronic key $10_c$ and rendering it inoperative.

Embodiments of the subject matter described include apparatus, methods, and/or systems and a number of implementations have been described herein, including various subcombinations, and subsets thereof, for purposes of illustration and description. It will be understood that the foregoing is not intended to limit the subject matter to the disclosed embodiments and other variations, implementations, and modifications may be made without departing from the scope and spirit of the disclosure.

For example, in FIG. 1 electronic key 10 is depicted as communicating with two electronic locking devices 110. This is not to be interpreted as requiring electronic key 10 to communicate with a specific number of electronic locking devices 110 and skilled persons will appreciate that the drawings and detailed descriptions provided herein are for illustrative purposes. Access control system 100 may comprise any desired ratio and arrangement of devices. Moreover, the logic flows disclosed in the figures may not necessarily require the particular order shown to achieve the desired utility. Other steps may be added, or steps may be eliminated from the logical flows described herein. Similarly, other components may be added and/or removed from the apparatus and/or systems described herein. Accordingly, other implementations are within the scope of the following claims.

It should be understood that as used in this disclosure and throughout the claims that follow, the meaning of "a," "an," and "the" includes plural reference unless the context clearly prescribes otherwise. Further, as used in this disclosure and throughout the claims that follow, the meaning of "in" includes "in" and "on" unless the context clearly prescribes otherwise. Finally, as used in this disclosure and throughout the claims that follow, the meanings of "and" and "or" include both the conjunctive and disjunctive and may be used interchangeably unless the context expressly prescribes otherwise.

It is claimed:

1. A method, performed by a portable electronic key, for remotely managing access control information in an access control system including the portable electronic key and a set of electronic locking devices so as to facilitate an access event in response to the portable electronic key coupling with, energizing circuitry of, and signaling, based on an access credential, an electrical signal to a member of the set of electronic locking devices operatively associated with the access credential, the method comprising:

maintaining in memory sites of the portable electronic key the access credential including a first schedule defining, for each member of the set of electronic locking devices, a corresponding period in which the portable electronic key is authorized to initiate the access event;

establishing, based on a wireless networking standardized communication protocol, a wireless communications link between the portable electronic key and a networking device operatively associated with a remote administration device located away from the portable electronic key;

transmitting from the portable electronic key, through the wireless communications link, a first message formatted according to a request-response protocol and including an instruction for exchanging access control information between a first application of the portable electronic key and a second application of the remote administration device located away from the portable electronic key;

receiving, at the portable electronic key and in response to the message, the access control information that causes a change from the first schedule to a second schedule, the second schedule being different from the first schedule; and in response to receiving the access control information, accessing the memory sites for configuring the access credential in accordance with the second schedule and thereafter transmitting, through the wireless communications link to the second application of the remote administration device, a second message formatted according to a request-response protocol, the second message representing the updated access credential, to thereby facilitate, at the remote administration device located away from the portable electronic key, administration of the access control system by exchanging messages with the portable electronic key to enable the portable electronic key to initiate the access event at any member of the set of electronic locking devices according to the second schedule and to further enable remote monitoring of the access credential maintained in memory sites of the electronic key.

2. The method of claim 1, wherein the wireless networking standardized communication protocol is selected from the group consisting of a Bluetooth protocol, an IEEE 802.11 (Wi-Fi) protocol, an IEEE 802.16 (WiMax) protocol, an IEEE 802.15.4 (ZigBee) protocol, a 3rd Generation Partnership Project (3GPP) protocol, a Long Term Evolution (LTE) protocol, a Global System for Mobile Communications (GSM) protocol, and a Code Division Multiple Access (CDMA) protocol.

3. The method of claim 1, wherein the wireless communications link is established over a network selected from the group consisting of a wireless local area network, a wireless personal area network, a wireless mesh network, a wireless wide area network, a wireless ad hoc network, a cellular network, and Internet.

4. The method of claim 1, wherein the first message and the second message are formatted according to a layer 7 application protocol in accordance with an Open System Interconnection (OSI) model.

5. The method of claim 1, wherein the first message and the second message are formatted according to a protocol selected from the group consisting of a hypertext transfer protocol (HTTP), a hypertext transfer protocol secure (HTTPS), a file transfer protocol (FTP), and a secure file transfer protocol (SFTP).

6. The method of claim 1, wherein the first application is a credential management application, and wherein the credential management application is further configured to operate in a client-server relationship with the second application.

7. The method of claim 6, wherein the second application is a server application, and wherein the server application is selected from the group consisting of a web server, a database server, an application server, and a file server.

8. The method of claim 1, wherein the first schedule defines for a first member of the set of electronic locking devices, a first period in which the portable electronic key is authorized to initiate the access event, and further defines for a second member of the set of electronic locking devices, a second period in which the portable electronic key is authorized to initiate the access event, the second period being different than the first period.

9. An access control system for remote administration of access control information, the system comprising:

a set of electronic locking devices;

a remote administration device located away from the set of electronic locking devices, the remote administration device comprising a memory for storing and a first application for managing the access control information, the access control information including scheduling information that controls accessibility of the set of electronic locking devices;

a networking device operatively associated with the remote administration device; and a portable electronic key configured to mechanically couple with, energize circuitry of, and signal, based on an access credential, an electrical signal to a member of the set of electronic locking devices operatively associated with the access credential so as to cause an occurrence of an access event, wherein the access credential includes a first schedule defining, for each member of the set of electronic locking devices, a corresponding period in which the portable electronic key is authorized to initiate the access event, and wherein the portable electronic key comprises:

wireless communication circuitry configured to use, while the portable electronic key is located away from the remote administration device, a wireless networking standardized communication protocol so as to establish a wireless communications link between the portable electronic key and the networking device operatively associated with the remote administration device for initiating exchange, with the remote administration device, of messages related to the access control information;

a second application configured to use a request-response protocol with the first application of the remote administration device for facilitating, at periodic intervals, the exchange of messages including an instruction for receiving at the portable electronic key a second schedule of the access control information, the second schedule being different than the first schedule; and a processor configured to respond to the exchange of messages by changing the access credential in accordance with the second schedule and thereafter generating a response message representing the updated access credential for transmission to the remote administration device to thereby facilitate, at the remote administration device located away from the portable electronic key and independently of a key holder's influence over the portable electronic key, remote administration of the access control system.

10. The system of claim 9, wherein the request-response protocol is a layer 7 application protocol in accordance with an Open System Interconnection (OSI) model.

11. The system of claim 9, wherein the request-response protocol is selected from the group consisting of a hypertext transfer protocol (HTTP), a hypertext transfer protocol secure (HTTPS), a file transfer protocol (FTP), and a secure file transfer protocol (SFTP).

12. The system of claim 9, wherein the wireless networking standardized communication protocol is selected from the group consisting of a Bluetooth protocol, an IEEE 802.11 (Wi-Fi) protocol, an IEEE 802.16 (WiMax) protocol, an IEEE 802.15.4 (ZigBee) protocol, a 3rd Generation Partnership Project (3GPP) protocol, a Long Term Evolution (LTE) protocol, a Global System for Mobile Communications (GSM) protocol, and a Code Division Multiple Access (CDMA) protocol.

13. The system of claim 9, wherein the wireless communications link is established over a network selected from the group consisting of a wireless local area network, a wireless personal area network, a wireless mesh network, a wireless wide area network, a wireless ad hoc network, a cellular network, and Internet.

14. The system of claim 9, wherein the second application is a credential-management application, and wherein the credential-management application is further configured to operate in a client-server relationship with the first application.

15. The system of claim 14, wherein the first application is a server application, and wherein the server application is selected from the group consisting of a web server, a database server, an application server, and a file server.

16. The system of claim 9, wherein either the first application or the second application is a web browser.

17. The system of claim 9, wherein the remote administration device includes a display screen, and wherein the display screen is configured to present an access control system interface for a user viewing the display screen, the access control system interface including access control information communicated by the exchange of messages.

18. The system of claim 9, wherein the second application is further configured to enter a sleep mode during intervals between the periodic intervals, and wherein the sleep mode is characterized by the wireless communication circuitry being in a non-transmitting state while the second application is in a sleep mode so as to reduce power consumption of the portable electronic key.

19. The system of claim 9, wherein the first schedule defines for a first member of the set of electronic locking devices, a first period in which the portable electronic key is authorized to initiate the access event, and further defines for a second member of the set of electronic locking devices, a second period in which the portable electronic key is authorized to initiate the access event, the second period being different than the first period.

20. The system of claim 17, wherein the remote administration device is a mobile device, and wherein the mobile device is selected from the group consisting of a cellular phone, a tablet computer, and a laptop computer.

* * * * *